(12) United States Patent
Ogawa

(10) Patent No.: US 6,579,398 B1
(45) Date of Patent: Jun. 17, 2003

(54) METHOD OF MANUFACTURING OPTICAL WAVEGUIDE

(75) Inventor: Tsuyoshi Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 09/615,833

(22) Filed: Jul. 13, 2000

(30) Foreign Application Priority Data

Jul. 13, 1999 (JP) .......................................... 11-199023

(51) Int. Cl.[7] .................... B44C 1/165; B32B 31/28; B05D 5/12; G02B 6/12; G02B 6/00
(52) U.S. Cl. .................. 156/230; 156/232; 156/240; 156/241; 156/247; 156/272.2; 156/289; 427/146; 427/162; 427/96; 428/40.4; 428/41.8; 428/42.2; 428/203; 428/344; 428/914; 385/14; 385/147
(58) Field of Search ................................ 156/230, 233, 156/235, 237, 231, 240, 241, 244.17, 247, 272.2, 272.5, 277, 289; 427/146, 147, 148, 162, 164, 165, 167, 96; 428/40.4, 41.5, 41.8, 42.2, 195, 203, 344, 914; 385/14, 147

(56) References Cited

U.S. PATENT DOCUMENTS

| | | | | |
|---|---|---|---|---|
| 4,246,297 A | * | 1/1981 | Nablo et al. | 427/44 |
| 4,263,077 A | * | 4/1981 | Rampelberg | 156/238 |
| 5,296,063 A | * | 3/1994 | Yamamura et al. | 156/64 |
| 5,932,352 A | * | 8/1999 | Higgins | 428/423.1 |
| 5,997,990 A | * | 12/1999 | Kambara et al. | 428/167 |
| 6,036,809 A | * | 3/2000 | Kelly et al. | 156/247 |

FOREIGN PATENT DOCUMENTS

| | | | | |
|---|---|---|---|---|
| GB | 2240682 A | * | 7/1991 | H04B/10/12 |
| JP | 04-276705 | * | 10/1992 | G02B/6/12 |

* cited by examiner

Primary Examiner—J. A. Lorengo
(74) Attorney, Agent, or Firm—Robert J. Depke; Holland & Knight LLC

(57) ABSTRACT

Disclosed is a method of manufacturing an optical waveguide, capable of easily manufacturing an optical waveguide which can hold an excellent light propagating characteristic irrespective of the kind of a supporting substrate. On a transparent substrate, a peelability promoting film obtained by setting silicone oil and an optical waveguide made of an epoxy resin are sequentially formed. The peelability promoting film promotes the peelability between the transparent substrate and the optical waveguide with sufficient adhesion that it is not peeled off from the transparent substrate during formation of the optical waveguide. Subsequently, after adhering a multilayer wiring board to the optical waveguide via an adhering layer made of a photosetting resin, the adhering layer is irradiated with light so as to be set, thereby fixing the multilayer wiring board to the optical waveguide. When a tensile stress is mechanically applied to the transparent substrate, the transparent substrate is easily peeled off from the optical waveguide together with the peelability promoting film, and the optical waveguide is transferred onto the multilayer wiring board.

19 Claims, 13 Drawing Sheets

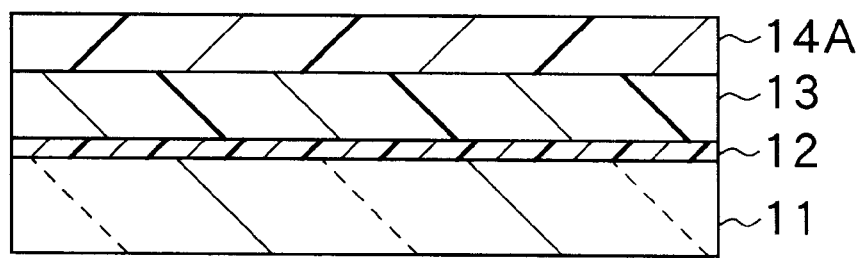
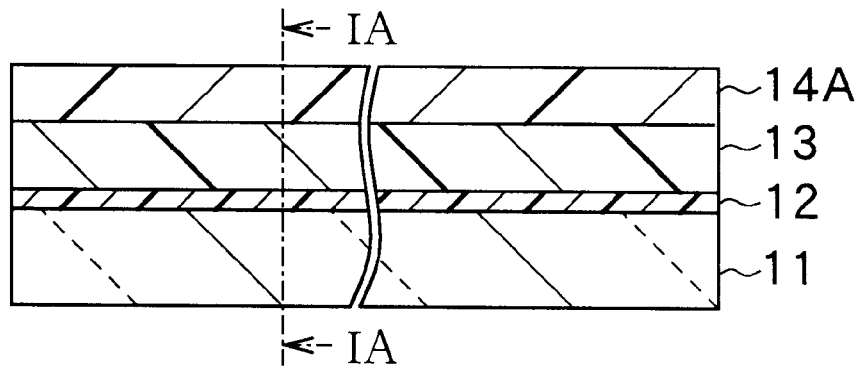
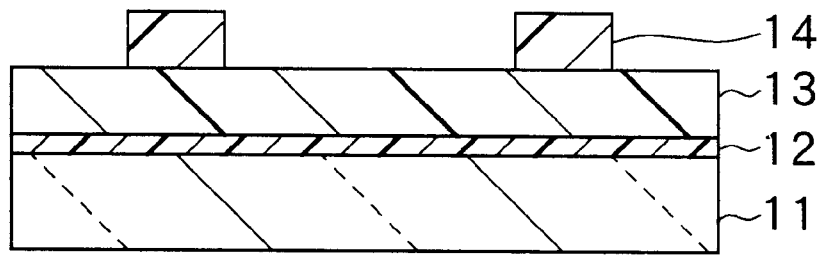
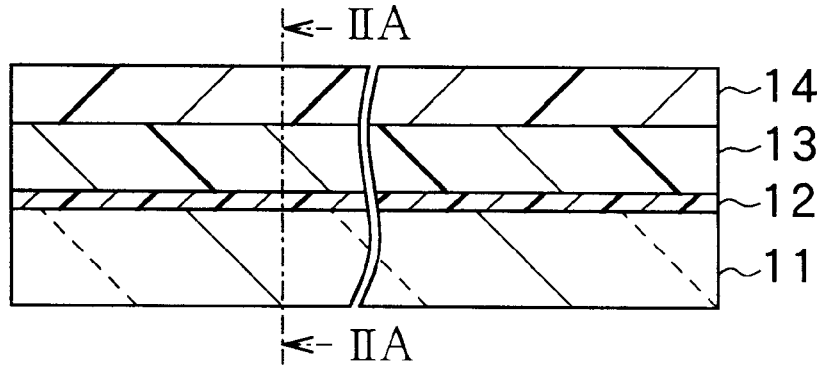

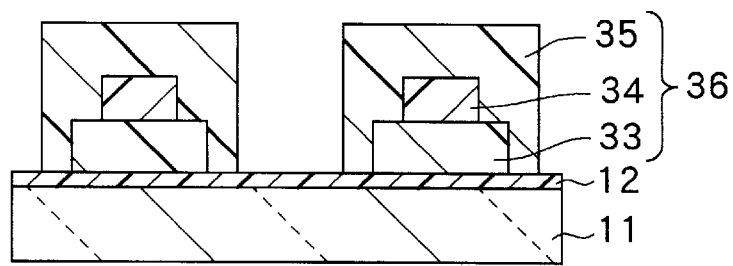
FIG.10A
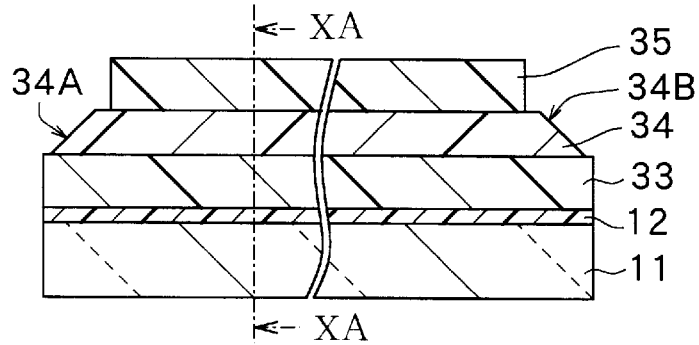
FIG.10B
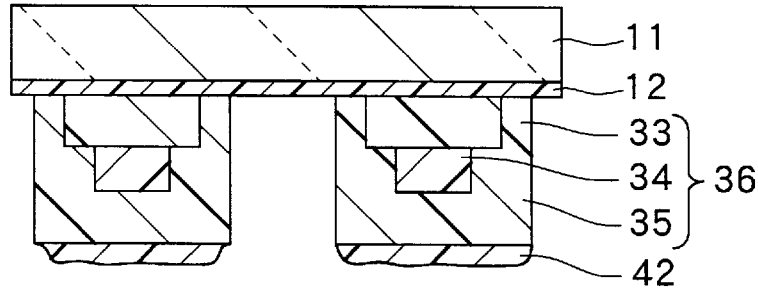
FIG.11A
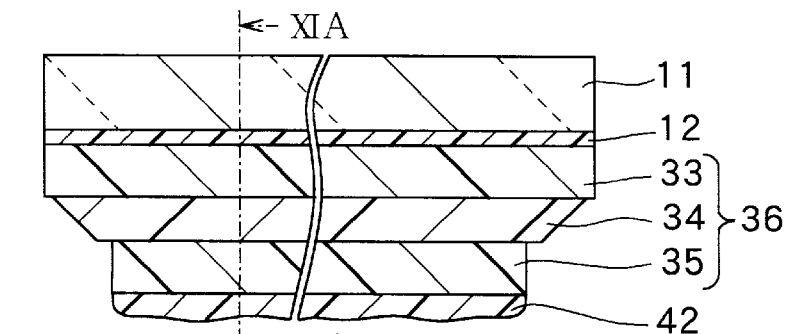
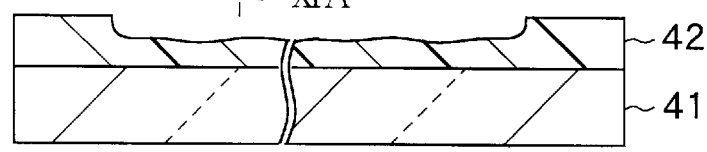
FIG.11B

METHOD OF MANUFACTURING OPTICAL WAVEGUIDE

BACKGROUND OF THE INVENTION

1. Field of the Invention

The present invention relates to a method of fabricating an optical waveguide through which a light signal propagates and a method of manufacturing an optical transmitting/receiving apparatus having such an optical waveguide.

2. Description of the Related Art

As the technology in an IC (Integrated Circuit) and an LSI (Large Scale Integrated) circuit progresses, their operating speed and scale of integration are improving and, for example, the higher performance of a microprocessor and the larger capacity of a memory chip are rapidly being achieved. Hitherto, transmission of information in relatively short distance, for example, between boards in a device or between chips on a board is carried out mainly via an electric signal. In order to further improve the performance of an integrated circuit in the future, it is necessary to increase the transmission rate of a signal and the density of signal wiring. In the electric signal wiring, however, it is difficult to increase the transmission rate of a signal and the density of signal wiring, and a problem of a signal delay by a time constant of CR (C: capacitance of wiring and R: resistance of wiring) of wires arises. Since an increase in transmission rate of the electric signal and an increase in density of the electric signal wiring cause EMI (Electromagnetic Interference) noises, it is indispensable to take countermeasures against the problems.

Optical wiring (optical interconnection) attracts a considerable attention as a means for solving the problems. The optical wiring is considered to be applicable to various situations such as the connection between devices, between boards in a device, or between chips on a board. Among them, for transmission of signals over relatively short distances such as transmission between chips, it is considered to be suitable to build a light transmission communication system. In the system, an optical waveguide is formed on a substrate on which chips are mounted and is used as a transmission line. In order to spread the light transmission communication system using the optical waveguide as a transmission line, it is important to establish a process of forming the optical waveguide.

As a known conventional method of fabricating an optical waveguide, a method of forming an optical waveguide made of quartz or a high polymer material such as PMMA (Polymethyl Methacrylate) or polyimide on a flat substrate such as a silicon substrate or glass substrate is known. Since the optical waveguide is formed on a flat substrate in the method, the optical waveguide with a slight loss in light propagation can be easily formed.

In the optical transmission communication system using the optical waveguide as a transmission line, however, a light emitting device for converting an electric signal into a light signal, a photodetecting device for converting a light signal into an electric signal, an IC chip for transmitting an electric signal between the light emitting device and the photodetecting device, and the like have to be provided. Supply of power to the devices and transfer of various control signals of relatively low speed have to be performed by electric signals as ever.

It is therefore indispensable to provide thin film multilayer wiring as electric signal wiring on a substrate. However, increasing the area in which the electric signal wires are formed to a normal wiring substrate size (tens cm per side) or a module size (a few cm per side) costs too much, and is difficult to be put into practice, thereby causing a problem.

In order to solve the problem, it can be considered to form an optical waveguide on a printed wiring board on which electrical parts can be mounted. On the surface of such a wiring board manufactured by thick film process, however, a metal thick film formed by plating or the like is provided and the surface is considerably uneven. When an optical waveguide is formed on the printed wiring board, consequently, the shape of the optical waveguide is influenced by the surface unevenness of the board. It causes a problem such that a light propagation loss in the optical waveguide increases and the dimension accuracy deteriorates.

Further, in the case of forming the optical waveguide on the wiring board, in wet etching, cleaning and the like, a process of immersing the whole board in an acid or alkali solution, an organic solvent, or the like is necessary. Consequently, there is a problem such that the board may be damaged. There is also the possibility that the board is damaged in the event of dry etching and heat treatment at high temperature. It is therefore difficult to use an electric wiring board formed by a thick film process such as a printed wiring board as a board. An expensive board having characteristics such as high heat resistance has to be used.

SUMMARY OF THE INVENTION

The present invention has been achieved in consideration of the problems and its object is to provide a method of easily forming an optical waveguide capable of holding an excellent light propagating characteristic irrespective of the kind of a supporting board.

According to the invention, there is provided a method of manufacturing an optical waveguide by forming an optical waveguide on a first substrate side and then transferring the optical waveguide on the first substrate side to a second substrate side, comprising: a step of forming a peelability promoting film for promoting peelability between the first substrate and a layer to be formed on the first substrate; a step of forming at least an optical waveguide on the peelability promoting film; a step of fixing the optical waveguide supported by the first substrate and the second substrate to each other; and a step of peeling the first substrate off the optical waveguide.

According to the invention, there is also provided a method of manufacturing an optical transmitting/receiving apparatus having an optical waveguide by forming the optical waveguide on a first substrate side and transferring the optical waveguide from the first substrate side to a second substrate side, comprising: a step of forming a peelability promoting film for promoting peelability between the first substrate and a layer to be formed on the first substrate; a step of forming at least an optical waveguide on the peelability promoting film; a step of fixing the optical waveguide supported by the first substrate and the second substrate to each other; a step of peeling the first substrate off from the optical waveguide; a step of forming at least one of a light emitting device for converting an electric signal into a light signal and a photodetecting device for converting a light signal into an electric signal on the second substrate; and a step of forming an integrated circuit for transferring/receiving an electric signal to/from at least one of the light emitting device and the photodetecting device on the second substrate.

In the method of manufacturing the optical waveguide and the method of manufacturing the optical transmitting/receiving apparatus according to the invention, the peelability promoting film and the optical waveguide are sequentially formed on the first substrate. After that, the optical waveguide and the second substrate are fixed to each other. By peeling the first substrate off the optical waveguide by using the peelability promoting film, the optical waveguide is transferred from the first substrate to the second substrate.

Other and further objects, features and advantages of the invention will appear more fully from the following description.

BRIEF DESCRIPTION OF THE DRAWINGS

FIGS. 1A and 1B are cross sections for explaining a process in a method of manufacturing an optical transmitting/receiving apparatus according to a first embodiment of the invention.

FIGS. 2A and 2B are cross sections for explaining a manufacturing process subsequent to FIGS. 1A and 1B.

FIGS. 10A and 10B are cross sections for explaining a manufacturing process subsequent to FIGS. 9A and 9B.

FIGS. 11A and 11B are cross sections for explaining a manufacturing process subsequent to FIGS. 10A and 10B.

DETAILED DESCRIPTION OF THE PREFERRED EMBODIMENTS

Figure 3A:
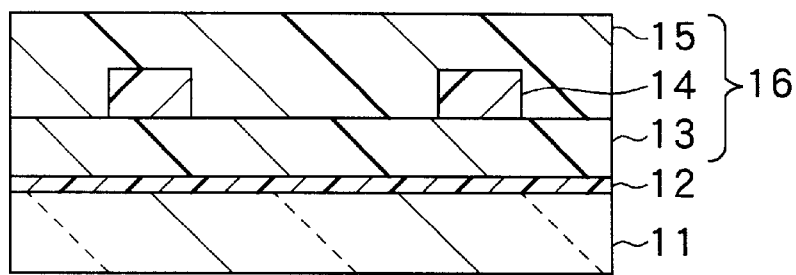
FIGS. 3A and 3B are cross sections for explaining a manufacturing process subsequent to FIGS. 2A and 2B.

Embodiments of the invention will be described in detail hereinbelow by referring to the drawings.

First Embodiment

Figure 5A:
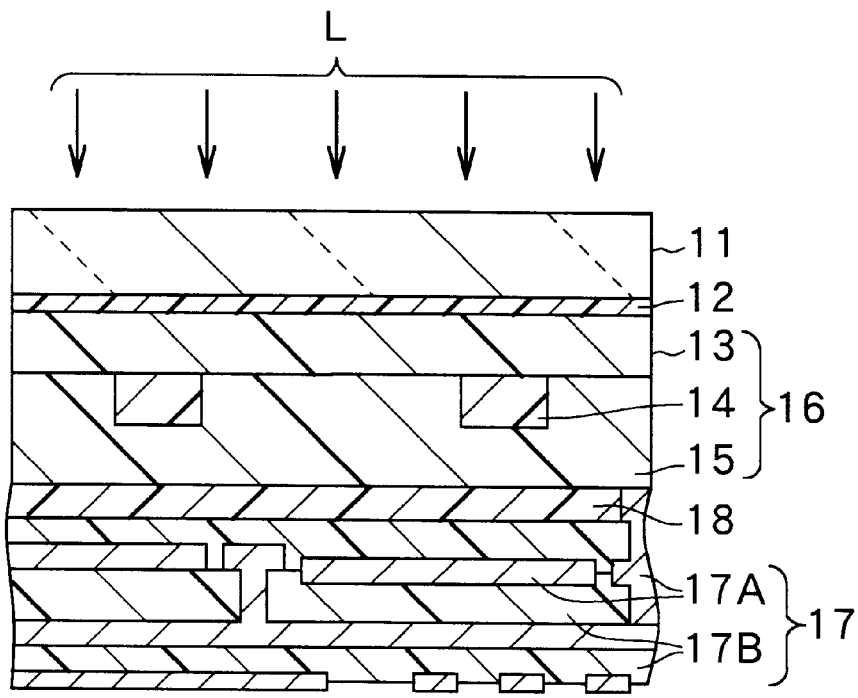
FIGS. 5A and 5B are cross sections for explaining a manufacturing process subsequent to FIGS. 4A and 4B.
Figure 5B:
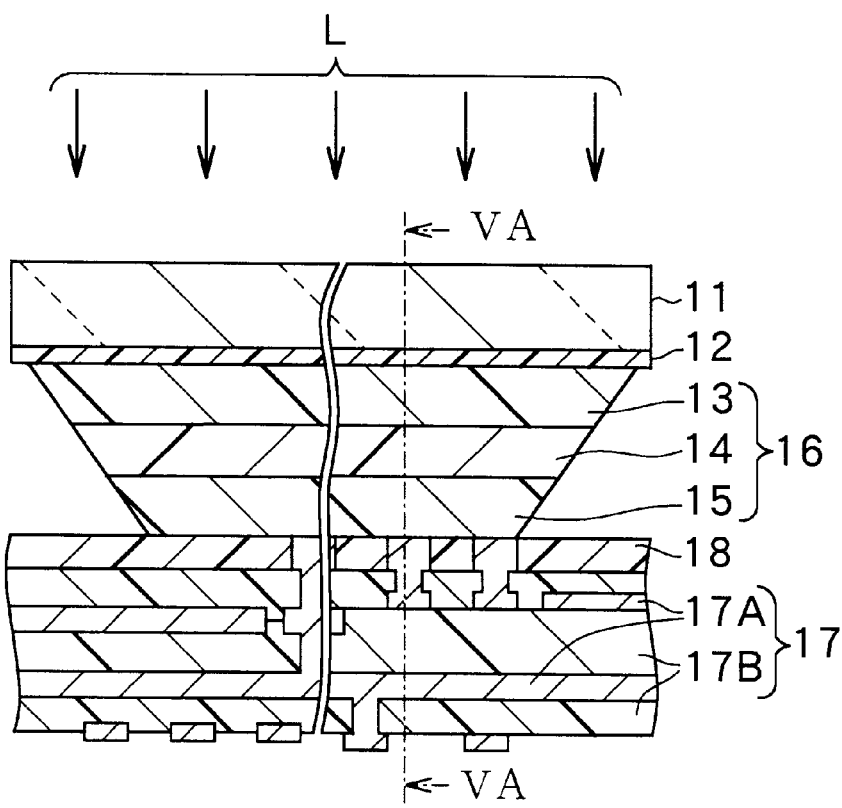
Figure 6A:
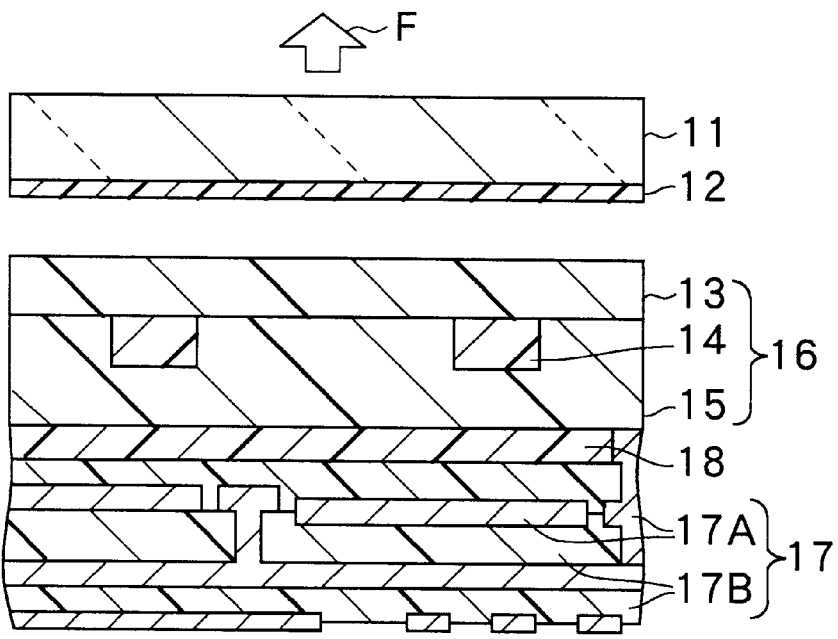
FIGS. 6A and 6B are cross sections for explaining a manufacturing process subsequent to FIGS. 5A and 5B.
Figure 6B:
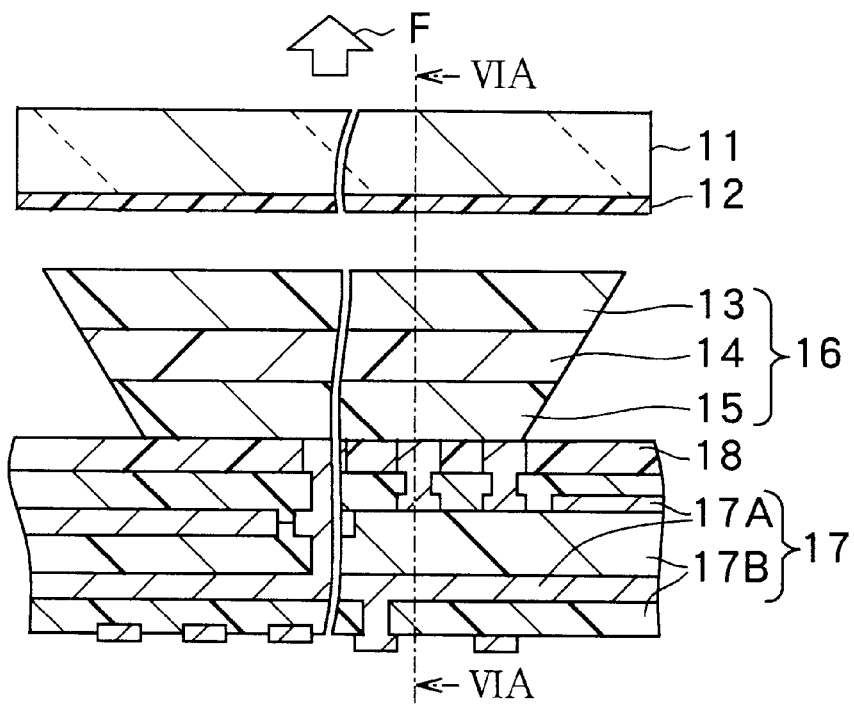
Figure 7:
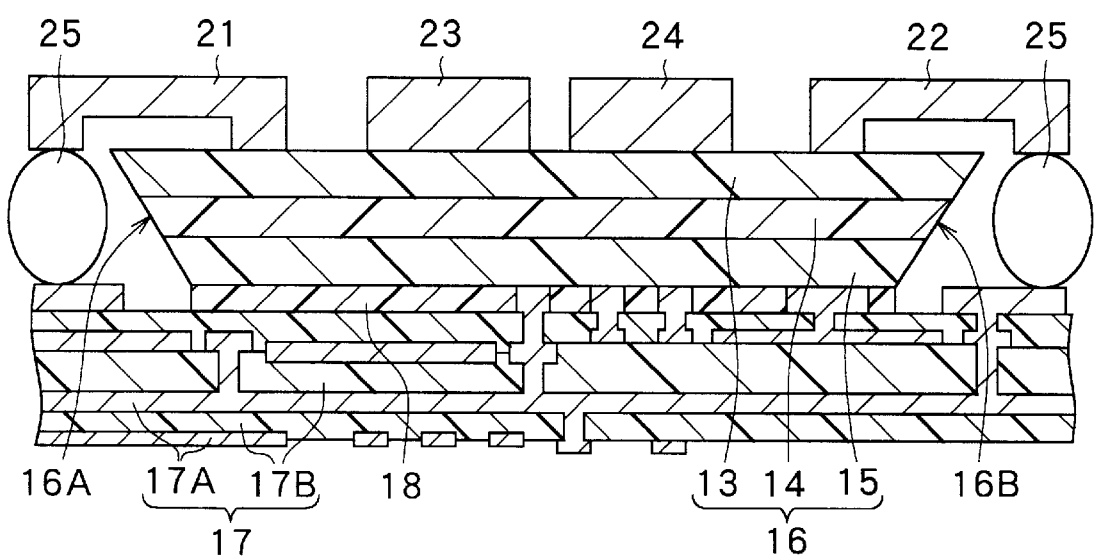
FIG. 7 is a cross section for explaining a manufacturing process subsequent to FIGS. 6A and 6B.

Referring now to FIGS. 1A and 1B to FIG. 7, a method of manufacturing an optical transmitting/receiving apparatus according to a first embodiment of the invention will be described. Since a method of fabricating an optical waveguide according to the embodiment is embodied by the method of manufacturing the optical transmitting/receiving apparatus according to the embodiment, it will be also described hereinbelow. Each of FIGS. 1A and 1B to FIG. 7 shows a manufacturing process in the method of manufacturing the optical transmitting/receiving apparatus. FIGS. 1A to 6A are cross sections perpendicular to the longitudinal direction of the optical waveguide. FIGS. 1B to 6B are cross sections parallel to the longitudinal direction of the optical waveguide. Each of FIGS. 1A to 6A is a cross section taken along line nA—nA (n denotes Roman numerals corresponding to each of FIGS. 1B to 6B). FIG. 7 is a cross section parallel to the longitudinal direction of the optical waveguide.

In the embodiment, first, as shown in FIGS. 1A and 1B, a very flat transparent substrate 11 made of a material such as quartz or glass which sufficiently transmits light from the ultraviolet region to the visible region is prepared. The transparent substrate 11 corresponds to an example of "first substrate" of the invention. On the transparent substrate 11, for example, liquid silicone (such as silicone oil) as a kind of siloxane is applied by spin coating and is subjected to a heat treatment at 150° C. for 30 minutes to 1 hour so as to be set, thereby forming a peelability promoting film 12. The peelability promoting film 12 is used to promote the peelability between the transparent substrate 11 and an optical waveguide 16 (refer to FIG. 3) which will be described hereinlater. While the optical waveguide is formed on the transparent substrate 11, the peelability promoting film 12 has the minimum adhesion of a degree at which the optical waveguide is not peeled off partially or totally from the transparent substrate 11.

On the peelability promoting film 12, an epoxy resin containing bisphenol as a main component is applied so as to be about 20 μm thick by spin coating. After that, a heat treatment is performed to set the resin, thereby forming a cladding layer 13 of the optical waveguide having a refractive index of, for example, 1.52. Subsequently, on the cladding layer 13, a core layer 14A of the optical waveguide having a refractive index of, for example, 1.54 and a thickness of about 30 μm is formed by using a material (such as epoxy resin) whose refractive index is higher than that of the material of the cladding layer 13 in a manner similar to the method of forming the cladding layer 13.

Subsequently, a photoresist film (not shown) having a pattern, for example, in a strip shape in plan view is formed and anisotropic dry etching such as RIE (Reactive Ion Etching) is performed by using the photoresist film as a mask. By the etching, as shown in FIG. 2A, a plurality of cores 14 which are apart from each other and each of which has a strip shape in plan view are obtained from the core layer 14A.

Figure 3B:
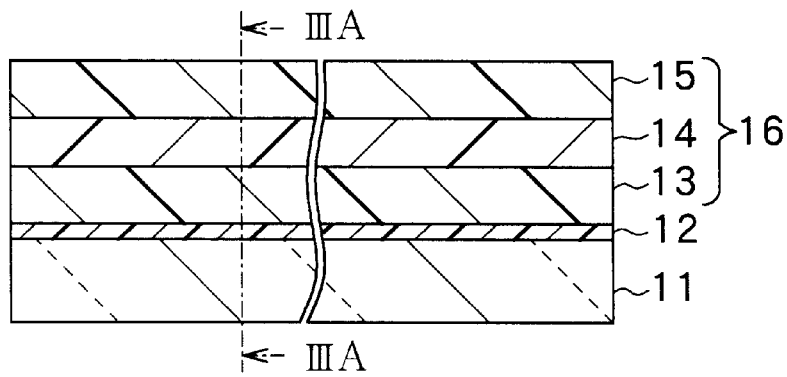

As shown in FIGS. 3A and 3B, for example, on the entire surface of the transparent substrate 11, a cladding layer 15 having a thickness of about 20 μm is formed on the cores 14 by using the same material as that of the cladding layer 13 in a manner similar to the method of forming the cladding layer 13. In such a manner, the buried optical waveguide 16 comprising the cladding layers 13 and 15 and the cores 14 is formed.

Each of the cladding layers 13 and 15 and the cores 14 may be formed by applying a photosetting resin on the underlayer and irradiating the photosetting resin with light to set the resin.

Figure 4A:
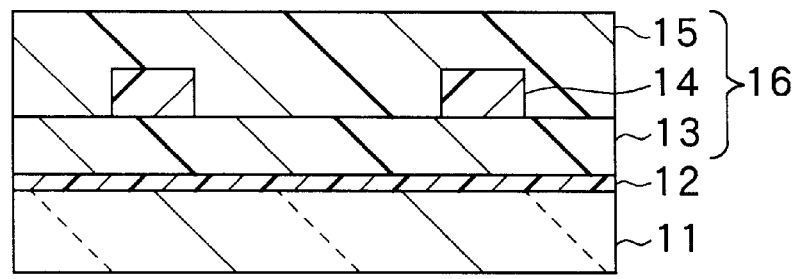
FIGS. 4A and 4B are cross sections for explaining a manufacturing process subsequent to FIGS. 3A and 3B.
Figure 4B:
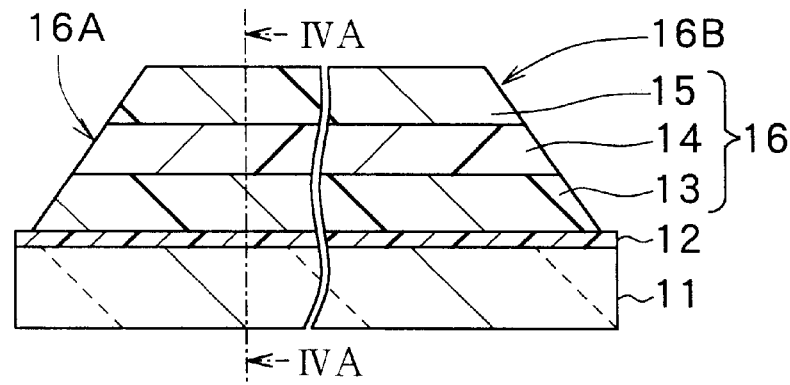

As shown in FIGS. 4A and 4B, for example, light reflecting portions 16A and 16B each constructed by an inclined face are formed at both ends in the longitudinal direction of the optical waveguide 16. The exterior angle formed between each of the reflecting portions 16A and 16B with the transparent substrate 11 is an obtuse angle (in this case, about 135°). The exterior angle formed between the optical waveguide 16 and the transparent substrate 11 denotes the exterior angle of a figure when the cross section along the light propagating direction of the optical waveguide 16 is regarded as a closed figure. An example of the method of forming the light reflecting portions 16A and 16B will be described specifically. First, a photoresist film (not shown) is formed on the cladding layer 15 and is subjected to predetermined exposing and developing processes, thereby processing the photoresist film in a predetermined pattern. The patterned photoresist film is heated, for example, at the glass transition temperature or higher to thereby incline the edge portions of the photoresist film. Subsequently, by using the photoresist film having inclined edges as a mask, anisotropic etching is performed on the optical waveguide 16 by an RIE system or ECR (Electro Cyclotron Resonance) system to thereby form the light reflecting portions 16A and 16B. After that, the photoresist film is removed.

As shown in FIGS. 5A and 5B, an arbitrary board such as a multilayer wiring board 17 having an electric wire 17A and an insulator 17B is prepared. In desired areas on the multilayer wiring board 17, an adhering layer 18 having a thickness of about 10 μm made of an adhesive containing a photosetting material such as epoxy resin is formed by a method such as spin coating, dip coating, spraying or printing. The adhering layer 18 plays not only the role of adhering the optical waveguide 16 and the multilayer wiring board 17 and but also the role of planarizing the rough surface of the multilayer wiring board 17. The multilayer wiring board 17 corresponds to an example of "second substrate" of the invention.

As the multilayer wiring board 17, for example, a ceramic multilayer wiring board in which the insulator 17B is made of an inorganic material such as alumina ($Al_2O_3$), low-temperature sintering glass ceramic, glass ceramic, aluminium nitride (AlN), or mullite is used. As the multilayer wiring board 17, the following may be also used; a glass epoxy multilayer wiring board in which the insulator 17B is made of a glass epoxy resin such as FR-4; what is called a built-up multilayer wiring board in which a high density pattern can be formed by a photolithography technique using a photosensitive epoxy resin or the like on a regular glass epoxy interconnection board; a flexible multilayer wiring board using a polyimide film or the like as the insulator 17B; and a multilayer wiring board using an organic material such as BT (bismaleimide triazine) resin, PPE (polyphenyl ether) resin, phenol resin, or polyolefine resin (Teflon made by DuPont). Besides, what is called a printed wiring board obtained by disposing a printed board on which an electric wiring pattern is printed at high density onto a core substrate made of a dielectric material or the like can be also used.

Then the transparent substrate 11 on which the optical waveguide 16 is formed is turned upside down. The multilayer wiring board 17 on which the adhering layer 18 is formed is adhered to the optical waveguide 16 while they are aligned. Since both the transparent substrate 11 and the optical waveguide 16 are transparent, they are easily aligned to the multilayer wiring board 17. Subsequently, in a state where the optical waveguide 16 on the transparent substrate 11 side and the multilayer wiring board 17 are adhered to each other, the transparent substrate 11 is irradiated with light L and the light L travels toward the multilayer wiring board 17 side. By the irradiation, the photosetting resin as the adhesive constructing the adhering layer 18 is set and the multilayer wiring board 17 is fixed in a desired position in the optical waveguide 16. At this time, when the light L of a large quantity is applied for short time, a distortion occurs in the optical waveguide 16 and a light propagation loss increases. The light L of a relatively small quantity is therefore applied for long time. For example, in the case of using a mercury lamp of very high pressure (wavelength; center of G string (436 nm)), light is emitted with an output of 10 mW/cm² for three minutes. After that, by heating the adhering layer 18 as necessary, a thermosetting process is performed on the adhesive.

The epoxy resin used in the embodiment is a light transmitting resin that transmits about 90% of light in the near ultraviolet and visible regions. As already described above, the transparent substrate 11 is sufficiently transparent in the range from the ultraviolet region to the visible region. For example, the light L emitted from the mercury lamp of very high pressure therefore transmits the transparent substrate 11 and the optical waveguide 16 and sufficiently reaches the adhering layer 18. Consequently, the adhering layer 18 made of an epoxy region or the like is completely set. Preferably, the adhesion between the optical waveguide 16 and the multilayer wiring board 17 is stronger than that between the optical waveguide 16 and the transparent substrate 11, which is lowered by the peelability promoting film 12.

As shown in FIGS. 6A and 6B, a physical force F such as tensile stress is applied to the transparent substrate 11 to separate the transparent substrate 11 from the optical waveguide 16. By the operation, the optical waveguide 16 is transferred to the multilayer wiring board 17. In this case, the peelability between the transparent substrate 11 and the optical waveguide 16 has been promoted by the peelability promoting film 12 provided between the transparent substrate 11 and the optical waveguide 16. The transparent substrate 11 is therefore easily peeled off together with the peelability promoting film 12 from the optical waveguide 16. A part or the whole of the peelability promoting film 12 may remain on the optical waveguide 16.

As shown in FIG. 7, a semiconductor laser 21, a photo diode 22, and IC chips 23 and 24 are mounted on the multilayer wiring board 17 by, for example, flip-chip bonding. Besides the semiconductor laser 21, photodiode 22 and IC chips 23 and 24, other devices such as a chip resistor, a capacitor and an inductor can be mounted. The semiconductor laser 21 corresponds to an example of "light emitting device" of the invention. The photodiode 22 corresponds to an example of "photodetecting device" of the invention. Each of the IC chips 23 and 24 corresponds to an example of "integrated circuit" of the invention.

Finally, although not shown, the semiconductor laser 21, photodiode 22 and IC chips 23 and 24 that are mounted and the multilayer wiring board 17 are sealed by a sealing resin such as an epoxy resin. It improves the connecting reliability between the semiconductor laser 21, photodiode 22 and IC chips 23 and 24 and the electric wiring 17A of the multilayer wiring board 17.

In the optical transmitting/receiving apparatus manufactured in such a manner, the semiconductor laser 21, photodiode 22 and IC chips 23 and 24 are made operative by the power supplied from the electric wiring 17A of the multilayer wiring board 18. In such a state, when an electric signal is outputted from the IC chip 23 to the semiconductor laser 21, the semiconductor laser 21 converts the electric signal into a light signal and outputs the light signal. The outputted light signal is totally reflected by the light reflecting portion 16A in the direction almost orthogonal to the incident direction and enters the optical waveguide 16. After that, the light signal propagates through the core 14 and reaches the light reflecting portion 16B. The light signal is totally reflected by the light reflecting portion 16B, for example, in the direction almost orthogonal to the light propagating direction, goes out from the optical waveguide 16 and enters the photodiode 22. The light signal incident on the photodiode 22 is converted into an electric signal and the electric signal is supplied to the IC chip 24. In such a manner, the signal to be transferred at high speed between the IC chips 23 and 24 is transferred at high speed as a light signal. A signal that can be transmitted at relatively low speed such as a low-speed control signal is transmitted as an electric signal via the electric wire 17A of the multilayer wiring board 17.

According to the method of manufacturing the optical transmitting/receiving apparatus according to the embodiment, after preliminarily forming the optical waveguide 16 on the very flat transparent substrate 11, the optical waveguide 16 is transferred onto the multilayer wiring board 17. Consequently, even in the case of using the multilayer wiring board 17 having the rough surface as a supporting substrate, an optical transmitting/receiving apparatus having the optical waveguide 16 in which the light propagation loss is small can be manufactured. Since the peelability promoting film 12 is provided between the transparent substrate 11 for forming an optical waveguide and the optical waveguide 16, the peelability between the transparent substrate 11 and the optical waveguide 16 is promoted. The transparent substrate 11 can be therefore easily peeled from the optical waveguide 16.

Second Embodiment

A second embodiment relates to a method of manufacturing an optical transmitting/receiving apparatus. The optical transmitting/receiving apparatus as the object is similar to that of the first embodiment except that optical waveguides are separated from each other. Referring to FIGS. 8A and 8B to FIGS. 13A and 13B, the method of manufacturing the optical transmitting/receiving apparatus of the embodiment will be described. FIGS. 8A to 13A are cross sections orthogonal to the longitudinal direction of the optical waveguide. FIGS. 8B to 13B are cross sections parallel to the longitudinal direction of the optical waveguide. Each of FIGS. 8A to 13A is a cross section taken along line a nA—nA (n denotes Roman numerals corresponding to each of FIGS. 8B to 13B, respectively). The same components as those of the first embodiment are designated by the same reference numerals and their detailed description is omitted here.

Figure 8A:
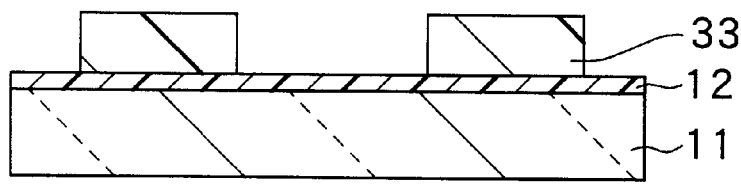
FIGS. 8A and 8B are cross sections for explaining a process in a method of manufacturing an optical transmitting/receiving apparatus according to a second embodiment of the invention.
Figure 8B:
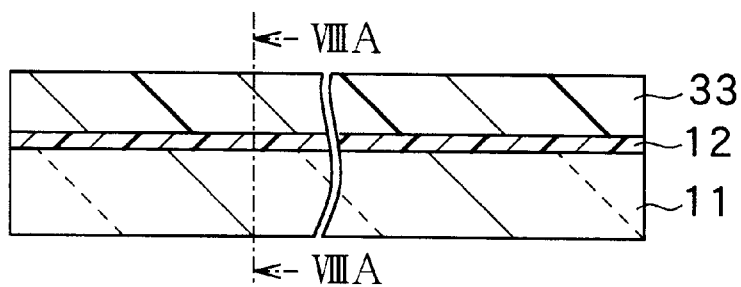

In the embodiment, first, as shown in FIGS. 8A and 8B, the peelability promoting film 12 made of silicone oil or the like is formed on the transparent substrate 11. On the peelability promoting film 12, a photosetting epoxy resin layer containing bisphenol as a main component is formed so as to be about 20 $\mu$m thick by, for example, spin coating. By using a mask having a predetermined aperture pattern and a mercury lamp of very high pressure, the epoxy resin layer is irradiated with light with an output of 10 mW/cm$^2$ for three minutes. The exposed part in the epoxy resin layer is thereby set and becomes a cladding layer 33 of the optical waveguide, which has a refractive index of, for example, 1.52. The other part remains unset. Subsequently, the unset part of the epoxy resin layer is selectively dissolved and removed by acetone or ethanol. In such a manner, a plurality of cladding layers 33 which are apart from each other are formed. The epoxy resin layer corresponds to an example of "organic material layer" of the invention.

Figure 9A:
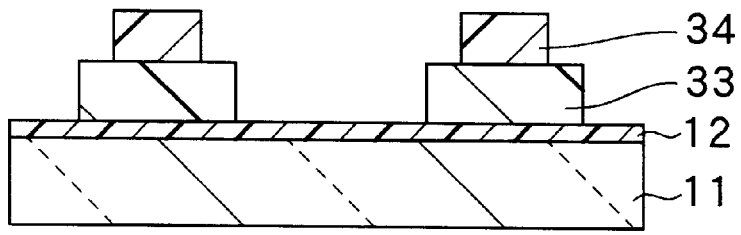
FIGS. 9A and 9B are cross sections for explaining a manufacturing process subsequent to FIGS. 8A and 8B.
Figure 9B:
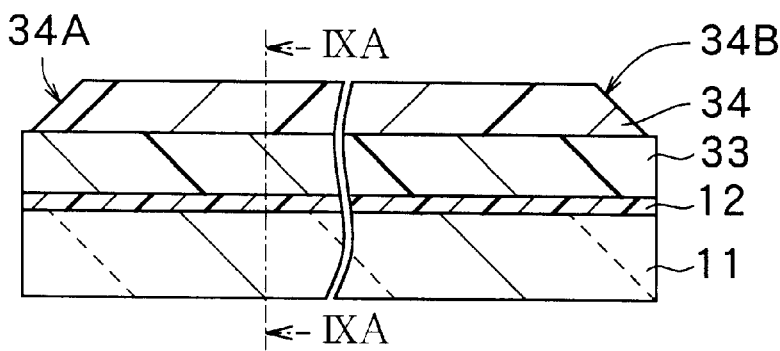

As shown in FIG. 9, a core 34 is selectively formed on each of the cladding layers 33. Specifically, for example, an epoxy resin layer containing bisphenol as a main component is formed on the whole surface of the transparent substrate 11 so as to be about 30 $\mu$m thick by spin coating. After that, by using a mask having a predetermined aperture pattern and, for example, a mercury lamp of very high pressure as a light source, the epoxy resin layer is selectively irradiated with light at an output of 10 mW/cm$^2$ for three minutes. The exposed portions in the epoxy resin layer are set and become the cores 34 of the optical waveguide, of which refractive index is, for example, 1.54. The other portion remains unset. Subsequently, the unset portion in the epoxy resin layer is selectively dissolved and removed by, for example, acetone or ethanol. After that, light reflecting portions 34A and 34B are formed as inclined surfaces at both ends in the longitudinal direction of each of the cores 34 in a manner similar to the method of creating the light reflecting portions 16A and 16B. The exterior angle formed between the transparent substrate 11 and each of the light reflecting portions 34A and 34B is an obtuse angle (in this case, about 135°). The epoxy resin layer for forming the core 34 also corresponds to an example of "organic material layer" of the invention.

As shown in FIGS. 10A and 10B, a cladding layer 35 having a refractive index of, for example, 1.54 is formed by using a material similar to that of the cladding layer 33 in a manner similar to the method of forming the cladding layer 33 so as to cover the whole area except for the light reflecting portions 34A and 34B of the core 34, thereby forming a plurality of optical waveguides 36 which are apart from each other. Each of the optical waveguides 36 is constructed by the core 34 and the cladding layers 33 and 35. In the optical waveguide 36, the light reflecting portions 34A and 34B are in contact with air having a refractive index of 1.00, so that the critical angle of the total reflection can be made small and a light loss in the light reflecting portions 34A and 34B can be also made small.

Figure 12A:
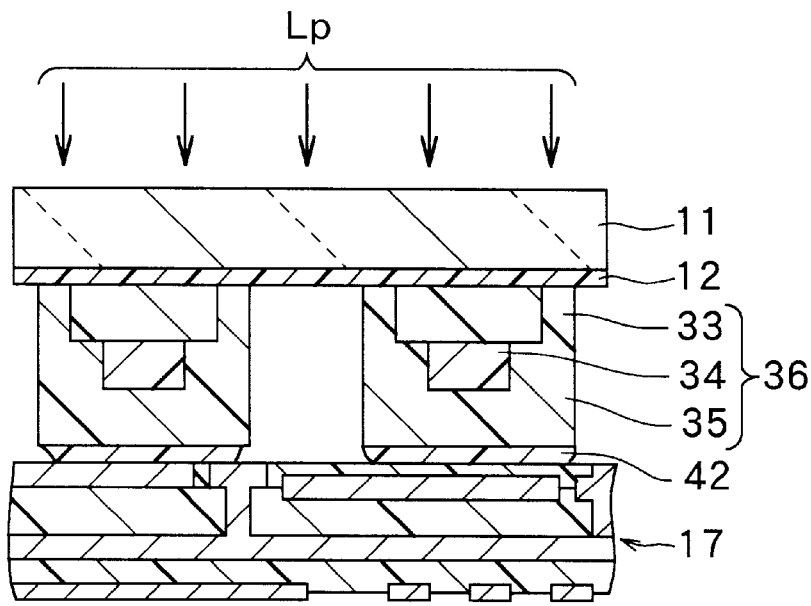
FIGS. 12A and 12B are cross sections for explaining a manufacturing process subsequent to FIGS. 11A and 11B.
Figure 12B:
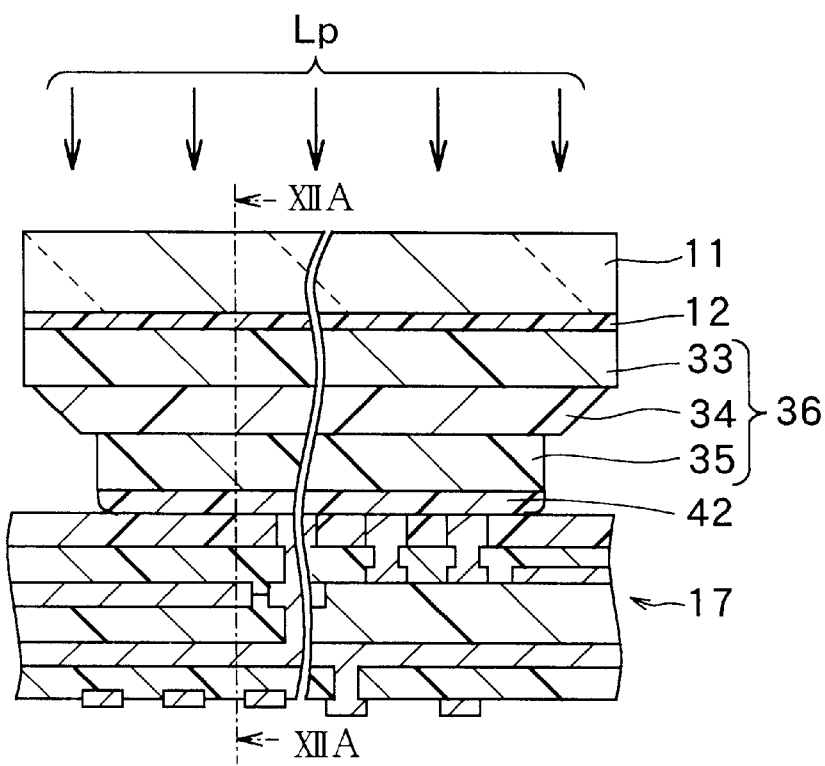

As shown in FIGS. 11A and 11B, a very flat substrate 41 to which an adhesive is to be applied is prepared. A liquid photosetting adhesive 42 such as an epoxy resin is applied on, for example, the whole surface of the substrate 41. After that, the transparent substrate 11 on which the optical waveguide 36 is formed is turned upside down so that the surface of the cladding layer 35 comes into contact with the adhesive 42, thereby adhering the cladding layer 35 to the adhesive 42. In a state where the adhesive 42 is adhered to the cladding layer 35, as shown in FIGS. 12A and 12B, the multilayer wiring board 17 and the optical waveguide 36 are adhered to each other via the adhesive 42 and the transparent substrate 11 is irradiated with parallel light Lp which travels toward the multilayer wiring board 17. When the accumulated light quantity of the irradiated parallel light Lp reaches, for example, few thousands mJ/cm$^2$, the adhesive 42 is set and the multilayer wiring board 17 is fixed to the optical waveguide 36.

In the case of using the adhesive 42 in a liquid state, when the viscosity is low, it is feared that the adhesive 42 is adhered also to side faces of the optical waveguide 36. In order to avoid the unnecessary adhesion, the adhesive 42 in the form of a gel or solid film sheet can be used. Such an adhesive generally has a thermosetting property. Consequently, the cladding layer 35 and the adhesive are once attached to each other and are subjected to a heat treatment (temporary curing), for example, at 80° C. for a few seconds, thereby adhering the adhesive 42 to the cladding layer 35. After that, the multilayer wiring board 17 and the optical waveguide 36 are closely attached to each other via the adhesive and are subjected to a heat treatment (curing in full gear), for example, at 150° C. for 30 to 60 minutes, thereby fixing the multilayer wiring board 17 to the optical waveguide 36. In the case of using the thermosetting adhesive, the alignment to the multilayer wiring board 17 can be carried out by using infrared rays. Consequently, in place of the transparent substrate 11, a substrate made of silicon or the like can be also used.

Figure 13A:
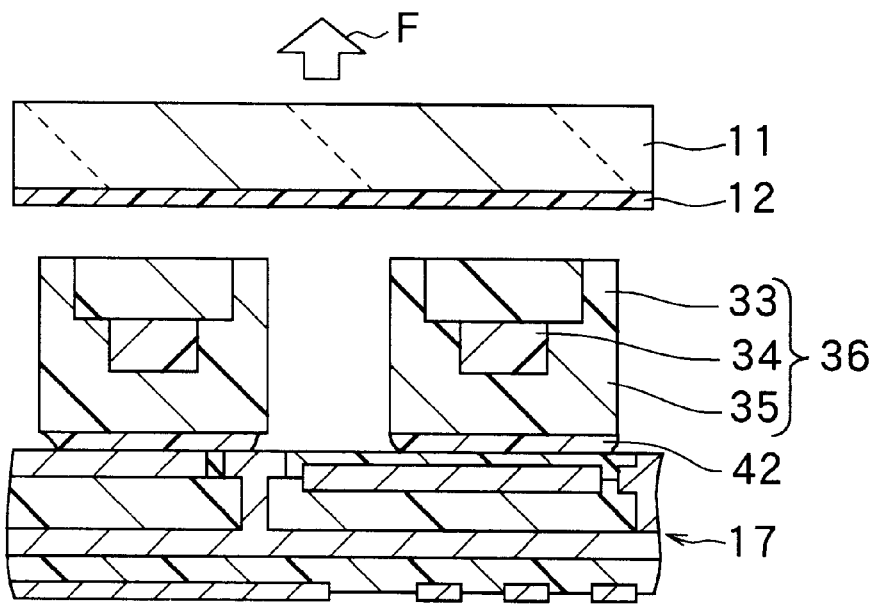
FIGS. 13A and 13B are cross sections for explaining a manufacturing process subsequent to FIGS. 12A and 12B.
Figure 13B:
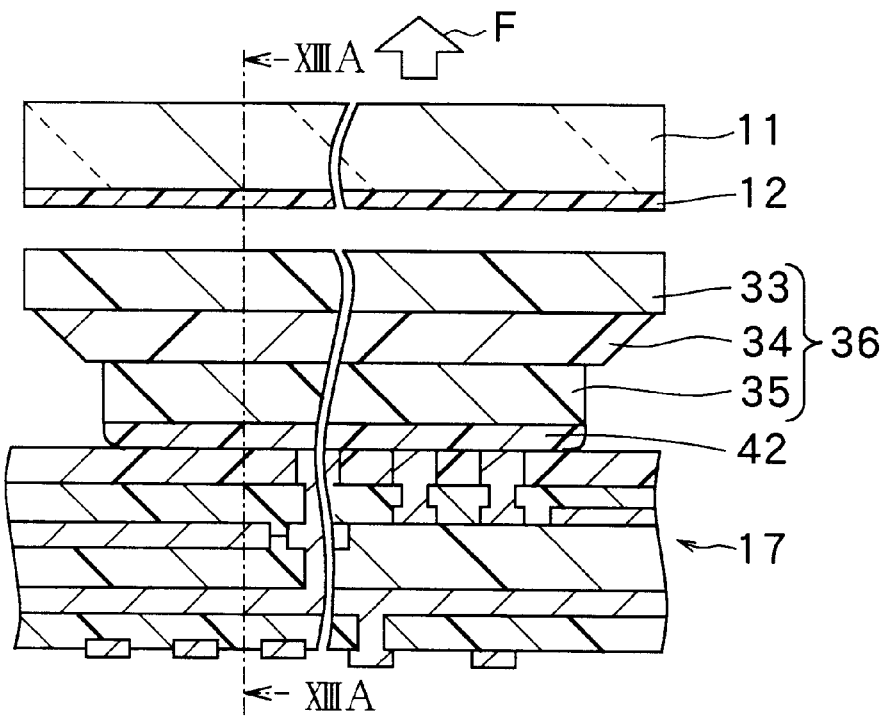

After fixing the multilayer wiring board 17 to the optical waveguide 36, as shown in FIGS. 13A and 13B, a physical force F such as tensile stress is applied onto the transparent substrate 11 to separate the transparent substrate 11 from the optical waveguide 36. By the operation, the optical waveguide 36 is transferred to the multilayer wiring board 17. Although there is a case such that the peelability promoting film 12 partially or entirely remains on the optical waveguide 36 side, in such a case as well, the transparent substrate 11 is easily peeled off from the optical waveguide 36. Preferably, the peelability promoting film 12 is not left between the optical waveguides 36 since the remains become an obstacle in the event of disposing a light emitting device, a photodetecting device and the like later.

After that, although not shown, in a manner similar to the first embodiment, the semiconductor laser, photodiode, IC chip and the like are mounted on the multilayer wiring board 17 by, for example, flip-chip bonding. Further, by using a resin for sealing, the semiconductor laser, photodiode, IC chips and the like are sealed.

As described above, according to the method of manufacturing the optical transmitting/receiving apparatus of the embodiment, the optical waveguides 36 which are separated from each other are formed via the peelability promoting film 12 on the very flat transparent substrate 11 and then transferred to the multilayer wiring board 17. Consequently, the plurality of optical waveguides 36 on the transparent substrate 11 can be excellently and easily transferred onto the multilayer wiring board 17.

Although the case of forming the plurality of optical waveguides 36 each having a strip shape in plan view has been described above, by using the manufacturing method of the embodiment, optical waveguides 36 each having an arbitrary shape in plan view (such as L shape, U shape, or circular shape) formed on the transparent substrate 11 can be transferred onto the multilayer wiring board 17. For example, the optical waveguide is not transferred to a region where the optical waveguide is not desired to be transferred such as an electrode forming area in the multilayer wiring board 17 but can be transferred to only desired regions.

Third Embodiment

Figure 14A:
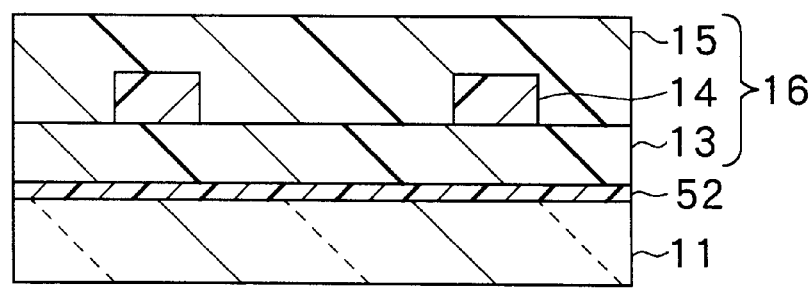
FIGS. 14A and 14B are cross sections for explaining a process in a method of manufacturing an optical transmitting/receiving apparatus according to a third embodiment of the invention.
Figure 14B:
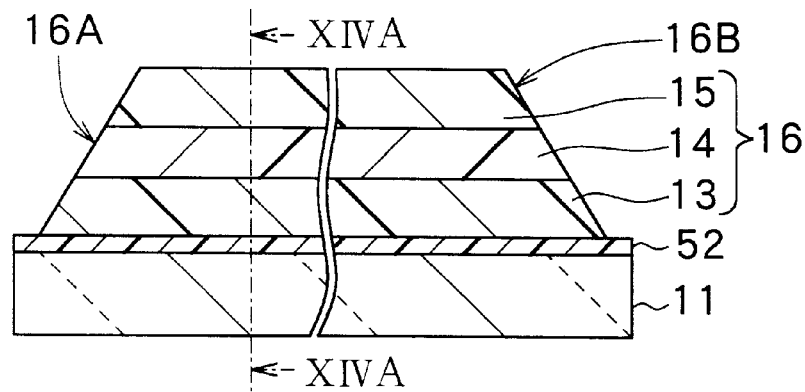
Figure 15A:
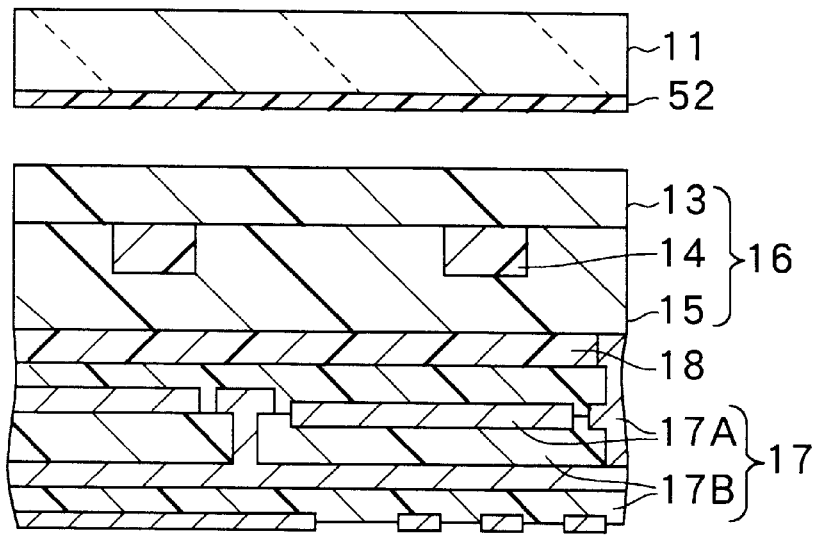
FIGS. 15A and 15B are cross sections for explaining a manufacturing process subsequent to FIGS. 14A and 14B.
Figure 15B:
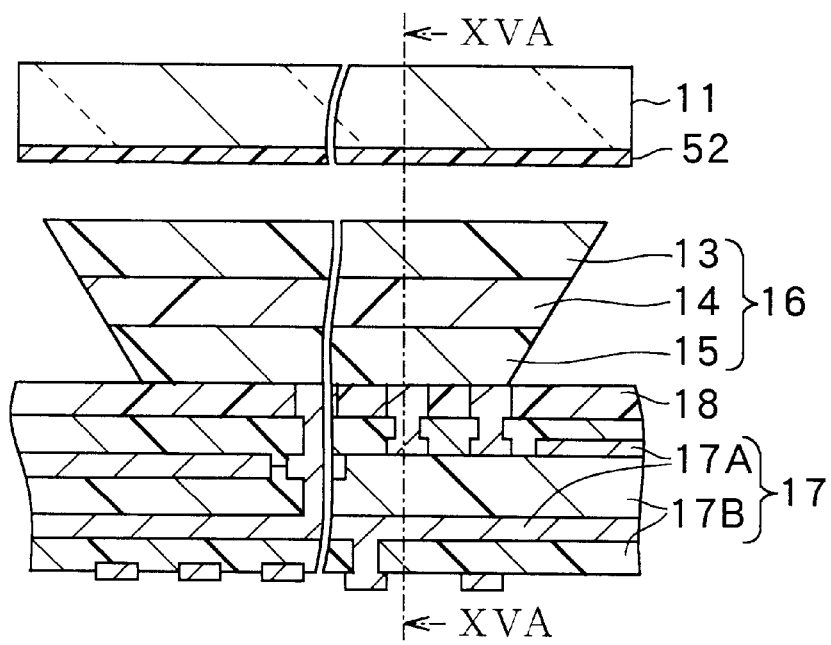

Referring now to FIGS. 14A and 14B, FIGS. 15A and 15B and the figures referred in the first embodiment, a method of manufacturing an optical transmitting/receiving apparatus according to a third embodiment of the invention will be described. The optical transmitting/receiving apparatus as the object is similar to that in the first embodiment. FIGS. 14A and 15A are cross section orthogonal to the longitudinal direction of the optical waveguide and FIGS. 14B and 15B are cross sections parallel to the longitudinal direction of the optical waveguide. FIGS. 14A and 15A are cross sections taken along lines XIVA—XIVA and XVA—XVA of FIGS. 14B and 15B, respectively. The same components as those of the first embodiment are designated by the same reference numerals and their description is omitted here.

First, as shown in FIGS. 14A and 14B, a photosetting acrylic resin is applied on the transparent substrate 11 by, for example, spin coating. The acrylic resin is irradiated with ultraviolet rays of a light quantity of 2000 mJ/cm$^2$ so as to be set, thereby forming a peelability promoting film 52 having a thickness of 20 $\mu$m. Subsequently, the optical waveguide 16 constructed by the cladding layers 13 and 15 and the core 14 is formed on the peelability promoting film 52 by, for example, a method similar to that of the first embodiment. When a photosetting resin is used as the material of the peelability promoting film 52, the resin is irradiated with light so as to be set.

The peelability promoting film 52 is used to promote the peelability between the transparent substrate 11 and the optical waveguide 16 in a manner similar to the peelability promoting film 12 of the first embodiment. The peelability promoting film 52 is excellently adhered to the cladding layer 13 at ordinary temperature. As the material of the peelability promoting film 52, a material having a glass transition temperature lower than that of the material (such as epoxy resin) of the optical waveguide 16 is used. The glass transition temperature denotes a temperature range in which the viscosity of a solid substance decreases and the material comes to have fluidity. The glass transition temperature of the acrylic resin used in the embodiment is, for example, about 80° C. and that of the epoxy resin is about 150 to 250° C. It is suitable to use the combination of the resins.

In a manner similar to the process shown in FIGS. 5A and 5B of the first embodiment, the optical waveguide 16 and the multilayer wiring board 17 are fixed to each other via the adhesive layer 18 made of, for example, an epoxy resin.

Subsequently, a heat treatment is conducted at a temperature which is higher than the glass transition temperature of the material (acrylic resin) of the peelability promoting film 52 and lower than the glass transition temperature of the material (epoxy resin in this case) of the optical waveguide 16, for example, at 100° C. Further, it is preferable to carry out the heat treatment at a temperature lower than the glass transition temperature of the multilayer wiring board 17. When the temperature of the peelability promoting film 52 becomes higher than the glass transition temperature of the film 52, the peelability promoting film 52 exhibits glass transition to a liquid state. As shown in FIGS. 15A and 15B, the transparent substrate 11 is easily peeled off from the optical waveguide 16 together with the peelability promoting film 52. Since the heat treatment is conducted at a temperature lower than the glass transition temperature of each of the materials of the optical waveguide 16, multilayer wiring board 17 and adhering layer 18, there is no possibility that the optical waveguide 16, multilayer wiring board 17 and adhesive layer 18 are damaged by the heat treatment.

After that, although not shown, in a manner similar to the first embodiment, the semiconductor laser, photodiode, IC chip and the like are mounted on the multilayer wiring board 17 by, for example, flip-chip bonding. Further, by using a sealing resin, the semiconductor laser, photodiode, IC chip and the like are sealed.

As described above, according to the method of manufacturing the optical transmitting/receiving apparatus of the embodiment, for a reason similar to the first embodiment, the optical transmitting/receiving apparatus having the optical waveguide 16 in which the light propagation loss is small can be manufactured. The peelability promoting film 52 made of a material having a glass transition temperature lower than that of the material of the optical waveguide 16 is provided between the transparent substrate 11 for forming the optical waveguide and the optical waveguide 16, in a post process. Therefore, when a heat treatment is performed at a temperature which is higher than the glass transition temperature of the forming material of the peelability promoting film 52 and is lower than the glass transition temperature of the forming material of the optical waveguide 16, the transparent substrate 11 can be easily peeled off from the optical waveguide 16 without damaging the optical waveguide 16.

Fourth Embodiment

Figure 16A:
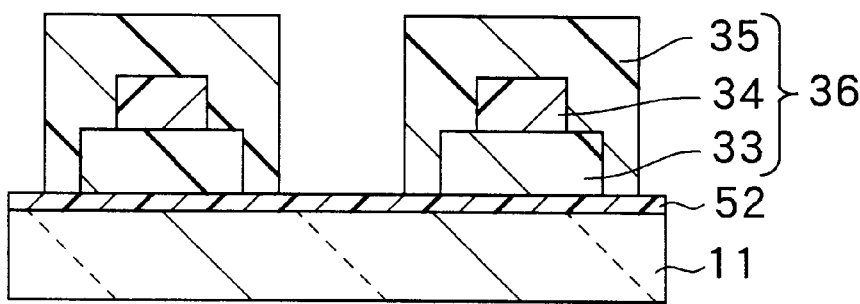
FIGS. 16A and 16B are cross sections for explaining a process in a method of manufacturing an optical transmitting/receiving apparatus according to a fourth embodiment of the invention.
Figure 16B:
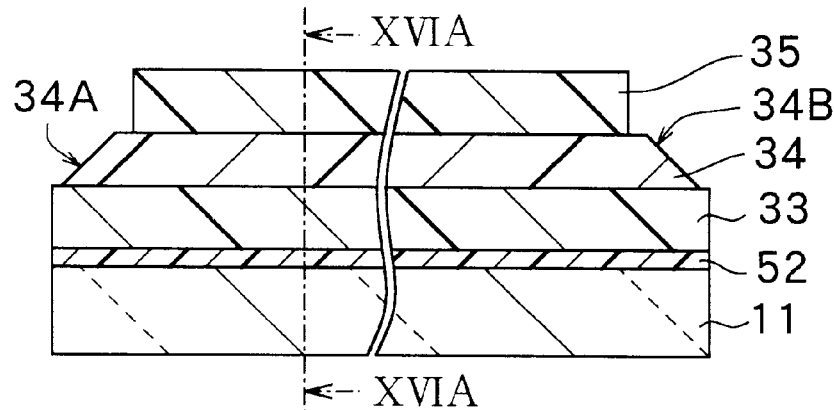
Figure 17A:
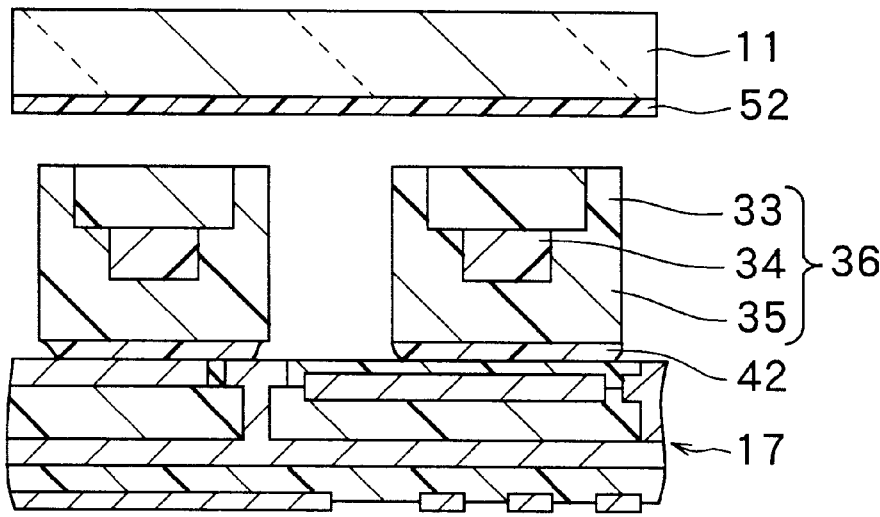
FIGS. 17A and 17B are cross sections for explaining a manufacturing process subsequent to FIGS. 16A and 16B.
Figure 17B:
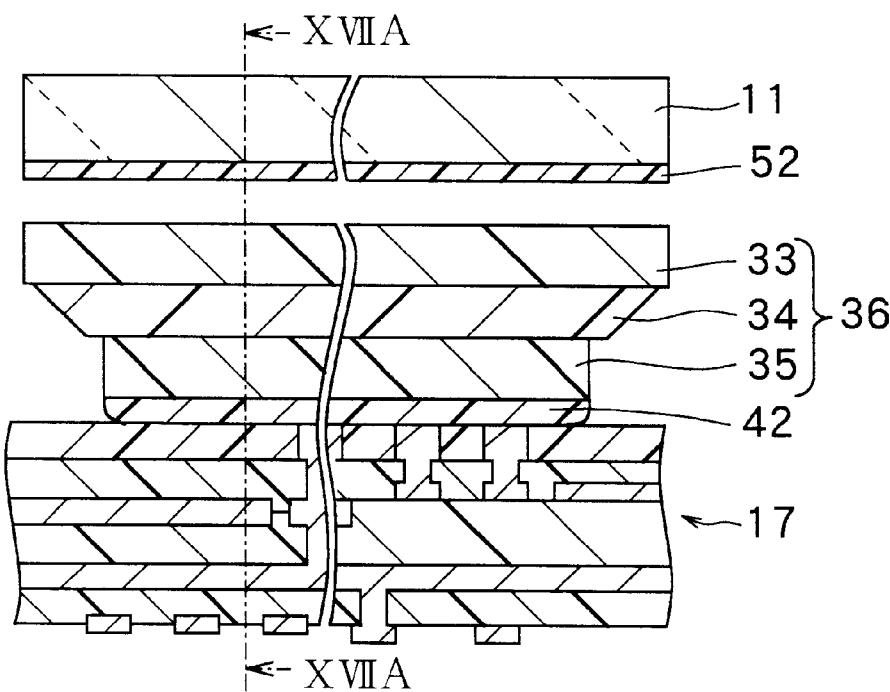

The fourth embodiment relates to a method of manufacturing an optical transmitting/receiving apparatus. In the optical transmitting/receiving apparatus as the object, like the second embodiment, optical waveguides are separated from each other. Referring now to FIGS. 16A and 16B and FIGS. 17A and 17B, the method of manufacturing the optical transmitting/receiving apparatus of the embodiment will be described hereinbelow. FIGS. 16A and 17A are cross sections orthogonal to the longitudinal direction of the optical waveguide. FIGS. 16B and 17B are cross sections parallel to the longitudinal direction of the optical waveguide. FIG. 16A is a cross section taken along line XVIA—XVIA of FIG. 16B and FIG. 17A is a cross section taken along line XVIIA—XVIIA of FIG. 17B. The same components as those of the first to third embodiments are designated by the same reference numerals and the detailed description is omitted here.

First, as shown in FIGS. 16A and 16B, the peelability promoting film 52 made of an acrylic resin or the like is formed on the transparent substrate 11. Subsequently, on the peelability promoting film 52, in a manner similar to the second embodiment, a plurality of optical waveguides 36 which are apart from each other are formed. Each of the optical waveguides 36 is constructed by the cladding layers 33 and 35 and the core 34. Then, in a manner similar to the second embodiment, the adhesive 42 is applied on the optical waveguides 36, and the optical waveguides 36 are adhered to the multilayer wiring board 17. After that, the transparent substrate 11 is irradiated with parallel light that travels toward the multilayer wiring board 17, thereby fixing the optical waveguides 36 and the multilayer wiring board 17 to each other.

A heat treatment is performed at a temperature which is higher than the glass transition temperature of the material (acrylic resin in this case) of the peelability promoting film 52 and lower than the glass transition temperature of the material of each of the optical waveguide 36 and the multilayer wiring board 17. By the heat treatment, as shown in FIGS. 17A and 17B, the transparent substrate 11 is easily peeled off together with the peelability promoting film 52 from the optical waveguide 36. The subsequent processes are similar to those of the first to third embodiments.

In a manner similar to the second embodiment, although there is a case such that the peelability promoting film 52 partly or entirely remains on the optical waveguide 36 side, in such a case as well, the transparent substrate 11 is easily peeled off from the optical waveguide 36.

As described above, according to the method of manufacturing the optical transmitting/receiving apparatus of the embodiment, for a reason similar to the second embodiment, the plurality of optical waveguides 36 on the transparent substrate 11 can be excellently and easily transferred onto the multilayer wiring board 17. The optical waveguides 36 can be transferred only in the necessary portions of the multilayer wiring board 17. Since the peelability promoting film 52 comprising a material having a glass transition temperature lower than that of the optical waveguide 36 is provided on the transparent substrate 11, when a heat treatment is conducted in a post process at a temperature which is higher than the glass transition temperature of the material of the peelability promoting film 52 and is lower than the glass transition temperature of the material of the optical waveguide 36, the transparent substrate 11 can be easily peeled off from the optical waveguide 36 without damaging the optical waveguide 36.

Although the invention has been described above by some embodiments, the invention is not limited to the foregoing embodiments but can be variously modified. For example, although the peelability promoting film 12 is made of liquid silicone in the first and second embodiments, the peelability promoting film 12 can be made of silicone in a gel state, or other materials such as siloxane that can promote the peelability between the transparent substrate 11 and the optical waveguide.

Although the peelability promoting film 52 is formed by applying the acrylic resin on the transparent substrate 11 in the third and fourth embodiments, the peelability promoting film 52 may be formed by laminating a film sheet made of an acrylic resin or the like on the transparent substrate 11. The material of the peelability promoting film 52 is not limited to the acrylic resin. Any material can be used as long as its glass transition temperature is lower than that of the material of the optical waveguides 16 and 36.

Further, although the adhering layer 18 is applied on the electric wiring substrate 17 side in the first and third embodiments, the adhering layer 18 may be applied on the optical waveguide 16 side.

In the second and fourth embodiments, the optical waveguide 36 is fabricated by forming the cladding layers 33 and 35 and the core 34 by selectively exposing the epoxy resin layer. Alternatively, in a manner similar to the first embodiment, it is possible to form the cladding layers 13 and 15 and the core 14 which are used as an optical waveguide precursor layer and to perform a process of dry etching such as RIE using an oxygen (O) plasma on the optical waveguide precursor layer to obtain a plurality of optical waveguides which are apart from each other. Further, the optical waveguides may be also split by another mechanical method such as etching using powders.

In the second and fourth embodiments, after adhering the adhesive 42 on the substrate 41 to the cladding layer 33, the multilayer wiring board 17 and the cladding layer 33 are fixed to each other via the adhesive 42. Alternatively, it is possible to adhere the multilayer wiring board 17 and the optical waveguide 36 to each other by applying a photosetting adhesive on the whole surface of the multilayer wiring board 17 and by selectively exposing and setting the adhering layer only, in the region in which the optical waveguide 36 is formed, by using a shielding film or the like.

Although the case where the material of each of the adhering layer 18 and the adhesive 42 has the photosetting property has been described in each of the embodiments, each of the adhering layer 18 and the adhesive 42 may be made of a thermosetting material. In this case, a proper heat treatment is performed to set the thermosetting material.

Further, although each of the cladding layer and the core layer is made of an epoxy resin in each of the embodiments, polyimide, an acrylic resin such as PMMA, a polyolefine resin such as polyethylene or polystyrene, a synthetic rubber or the like can be used. Further, it is also possible to increase transparency by using a material obtained by adding fluorine to any of the above resins.

As described above, in the method of manufacturing the optical waveguide or the method of manufacturing the optical transmitting/receiving apparatus according to one aspect of the invention, the optical waveguide formed on the first substrate is transferred to the second substrate. Consequently, the optical waveguide that can be conventionally formed only on an expensive substrate having an excellent heat resisting property can be formed on a less expensive substrate made of an arbitrary material in an arbitrary shape. By using a very flat substrate as the first substrate, the optical waveguide in which the light propagation loss is small can be fabricated. Further, since the peelability between the first substrate and the optical waveguide is promoted by providing the peelability promoting film between the first substrate and the optical waveguide, the first substrate can be easily peeled off from the optical waveguide.

In the method of manufacturing the optical waveguide according to another aspect of the invention, the peelability promoting film made of a material having a glass transition temperature lower than that of the material of the optical waveguide is provided between the first substrate and the optical waveguide, and in a later step of peeling the first substrate off from the optical waveguide, the heat treatment is performed at a temperature higher than the glass transition temperature of the material of the peelability promoting film. Consequently, while assuring the adhesion of the optical waveguide to the first substrate, the transfer of the optical waveguide to the second substrate can be facilitated.

In the method of manufacturing the optical waveguide according to further another aspect of the invention, a plurality of optical waveguides which are separated from each other are formed on the first substrate and are transferred from the first substrate side to the second substrate side. Thus, the plurality of optical waveguides that are separated from each other can be transferred to desired regions in an arbitrary substrate.

Obviously many modifications and variations of the present invention are possible in the light of the above teachings. It is therefore to be understood that within the scope of the appended claims the invention may be practiced otherwise than as specifically described.

What is claimed is:

1. A method of manufacturing an optical waveguide by forming an optical waveguide on a first substrate and then transferring the optical waveguide on the first substrate to a second substrate, comprising the steps of:
    forming a peelability promoting film on the first substrate for promoting peelability between the first substrate and a layer to be formed on the first substrate;
    securing at least an optical waveguide to the peelability promoting film;
    securing the optical waveguide and the second substrate to each other wherein the second substrate includes a plurality of electrical wirings and connections; and
    thereafter peeling the first substrate away from the optical waveguide.

2. The method of manufacturing the optical waveguide according to claim 1, wherein in the step of peeling the first substrate, the first substrate is peeled off by applying a physical force to the first substrate.

3. The method of manufacturing the optical waveguide according to claim 2, wherein the peelability promoting film is formed by using siloxane.

4. The method of manufacturing the optical waveguide according to claim 3, wherein the step of forming the peelability promoting film comprises:
    a step of applying silicone in a liquid state; and
    a step of setting the silicone by performing a heat treatment.

5. The method of manufacturing the optical waveguide according to claim 1, wherein the peelability promoting film is made of a material having a glass transition temperature at least lower than that of the material of the optical waveguide and,
    in a step of peeling the first substrate off the optical waveguide, the first substrate is peeled off by performing a heat treatment at a temperature higher than the glass transition temperature of the material of the peeling promoting film.

6. The method of manufacturing the optical waveguide according to claim 5, wherein the peelability promoting film is formed by using an acrylic resin.

7. The method of manufacturing the optical waveguide according to claim 5, wherein the heat treatment is performed at a temperature lower than the glass transition temperature of the material of the optical waveguide.

8. The method of manufacturing the optical waveguide according to claim 1, wherein the step of securing the optical waveguide and the second substrate to each other is performed by using an adhesive.

9. The method of manufacturing the optical waveguide according to claim 8, wherein a light transmitting material is used as the material of each of the first substrate and the peelability promoting film, a photosetting material is used as the material of the adhesive, and
    the step of securing the optical waveguide and the second substrate to each other comprises:
    adhering the optical waveguide and the second substrate to each other via the adhesive; and
    setting the adhesive by irradiating the adhesive with light through the first substrate toward the second substrate.

10. The method of manufacturing the optical waveguide according to claim 8, wherein a thermosetting material is used as the material of the adhesive.

11. The method of manufacturing the optical waveguide according to claim 1, wherein in the step of forming at least an optical waveguide on the peelability promoting film, a plurality of optical waveguides which are separated from each other are formed.

12. The method of manufacturing the optical waveguide according to claim 11, wherein the step of forming at least an optical waveguide on the peelability promoting film includes:
    a step of forming an organic material layer made of a photosetting organic material on the peelability promoting film;
    a step of irradiating the organic material layer with light and selectively exposing and setting some regions of the organic material layer, the regions on which the plurality of optical waveguides are to be formed; and
    a step of removing unset portions in the organic material layer, thereby forming the plurality of optical waveguides.

13. The method of manufacturing the optical waveguide according to claim 11, wherein the step of forming at least an optical waveguide on the peelability promoting film includes:
    a step of forming an optical waveguide precursor layer on the peelability promoting film by using the material of the optical waveguide; and a step of selectively etching and separating the optical waveguide precursor layer into a plurality of optical waveguides.

14. The method of manufacturing the optical waveguide according to claim 11, wherein the step of fixing the plurality of optical waveguides and the second substrate to each other comprises:

a step of applying an adhesive made of a photosetting material or a thermosetting material only on the surface opposite to the first substrate of each of the optical waveguides;

a step of adhering the optical waveguides and the second substrate to each other via the adhesive; and a step of setting the adhesive.

15. The method of manufacturing the optical waveguide according to claim 1, wherein the optical waveguide is made of a material containing at least one material selected from the group consisting of polyimide, epoxy resin, acrylic resin, polyolefine resin, and synthetic rubber.

16. The method of manufacturing the optical waveguide according to claim 1, wherein a substrate made of quartz or glass is used as the first substrate.

17. The method of manufacturing the optical waveguide according to claim 1, wherein a wiring board on which electric wiring is formed is used as the second substrate.

18. The method of manufacturing the optical waveguide according to claim 1, wherein a multilayer substrate containing at least one ceramic material selected from the group consisting of aluminum oxide (Al2O3), glass ceramic, aluminum nitride (AlN) and mullite is used as the second substrate.

19. The method of manufacturing the optical waveguide according to claim 1, wherein a multilayer substrate containing at least one of an organic material selected from the group consisting of a glass epoxy resin, polyimide, a BT (bismaleimide triazine) resin, a PPE (polyphenyl ether) resin, a phenol resin and a polyolefine resin is used as the second substrate.

* * * * *